Aug. 18, 1936. A. D. KARR ET AL Re. 20,069
METHOD AND APPARATUS FOR CONDITIONING AIR
Original Filed April 7, 1931
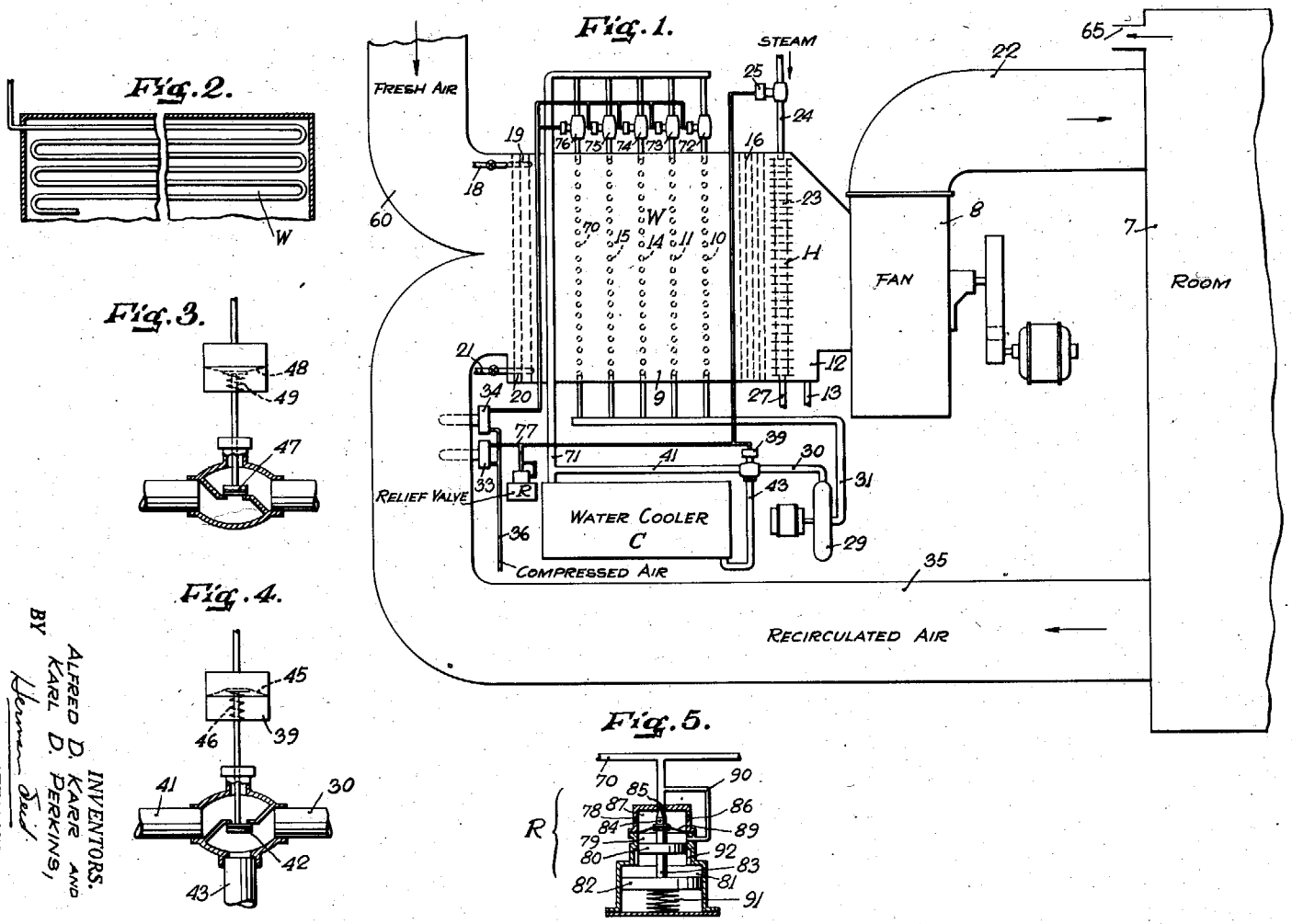
INVENTORS.
ALFRED D. KARR AND
KARL D. PERKINS,
BY Herman Seid
ATTORNEY.

Reissued Aug. 18, 1936 Re. 20,069

UNITED STATES PATENT OFFICE 20,069

METHOD AND APPARATUS FOR CONDITIONING AIR

Alfred D. Karr, Newark, N. J., and Karl D. Perkins, Providence, R. I., assignors, by mesne assignments, to Auditorium Conditioning Corporation, a corporation of New Jersey Original No. 1,904,468, dated April 18, 1933, Serial No. 528,340, April 7, 1931. Application for reissue December 31, 1934, Serial No. 759,998

17 Claims. (Cl. 62—176)

This invention relates to the conditioning of air and more particularly concerns an improved method of and apparatus for maintaining desirable atmospheric conditions within rooms, buildings or other enclosures.

In maintaining healthful and comfortable air conditions in large public enclosures such as theaters, auditoriums, etc., it is necessary, particularly during the warmer seasons of the year, to cool and dehumidify the air supplied to the enclosure. Dehumidification involves cooling the air to a temperature below its dewpoint whereby some of the moisture contained in the air is condensed and removed therefrom. After being thus cooled and dehumidified, the air is substantially saturated with moisture and is at a temperature considerably below that required for comfort in the enclosure. It is accordingly necessary to reheat the air after dehumidification and before it is introduced to the enclosure. The cooling and subsequent reheating of the air involves considerable expense and in many cases makes the cost of proper air conditioning prohibitive.

The conditioning of air for use in enclosures usually involves not only the treatment and introduction of fresh air from outside of the enclosure, but also the reintroduction and recirculaof air from the enclosure, the recirculated air being treated to dehumidify the same before reintroduction.

With the above and other considerations in mind, it is proposed in accordance with the present invention to provide an improved and simplified method for maintaining the air in an enclosure in the proper condition as to temperature and humidity which method effects a considerable saving in the amount of energy expended for the dehumidification and subsequent reheating of the air. More specifically, the improved method of our invention involves supplying both fresh and recirculated air to the enclosure, this air being first treated in such a manner that some of the heat content of both the fresh outside air and the air withdrawn from the enclosure is conserved and is employed to bring the dehumidified air to the proper room temperature before it is reintroduced to the enclosure. It is a further object of the invention to provide an improved method of automatically controlling the temperature and humidity of the air in the enclosure. Our invention includes not only an improved air conditioning method but also improved and simplified apparatus by means of which the method may be carried into effect.

The above and other objects of our invention are carried out by collecting all of the air to be introduced to the enclosure in a single stream and subjecting such stream to contact with cooling units or heat absorbers whereby some of the air in the stream is cooled and dehumidified by contact with the cooling units while other portions of the air pass between the elements of and are affected to a lesser degree by the units and accordingly retain considerable heat which is returned to the cooled and dehumidified air before the air stream is introduced to the enclosure. The cooling units employed preferably comprise a plurality of separate coils or cooler sections, each being located in the path of the air stream, and the supply of refrigerant or cooling fluid to the different units is preferably selectively controlled by automatic means responsive to the atmospheric conditions within the enclosure. The air employed in the stream to be treated may comprise fresh outside air only, but it is usually preferred to use a mixture of fresh air and air withdrawn from the enclosure for this purpose. In this manner, a portion of the heat content of both the fresh air and the recirculated air is conserved and returned to the cooled and dehumidified portions of the air stream. Since only a portion of the air in the stream is dehumidified, the amount of energy expended in refrigerating the air as well as the amount of energy used in reheating the air after dehumidification and cooling is appreciably reduced.

The invention contemplates the control of the temperature and humidity of the air introduced to the enclosure by variation of the number of active cooling units and by variation of the temperature of the cooling medium circulated through the active units. The number of active cooling units, that is, the proportion of the air in the stream which is dehumidified is preferably governed automatically in accordance with the humidity or the wet bulb temperature of the air withdrawn from the enclosure for recirculation.

The above and other objects and characteristics of the invention will be best understood by reference to the accompanying drawing, in which an air conditioning system embodying the invention has been diagrammaitcally illustrated. In the drawing:

Fig. 1 is a diagrammatic representation of an air conditioning system embodying the invention;

Fig. 2 is a sectional view of the cooler chamber employed in the system of Fig. 1; and Figs. 3, 4 and 5 are enlarged sectional views of the different types of automatically operable valves employed in the system of Fig. 1.

Referring to the drawing, and more particularly to Fig. 1, the system shown is employed to condition the air in a room or enclosure represented at 7, and comprises generally a cooler W, a fan or equivalent propelling device 8 and an air heating device H.

The cooler W includes a single air chamber 9. The bottom portion of the chamber 9 forms a liquid collecting pan 12 which is preferably provided with a drain pipe 13 for carrying off the moisture condensed from the air within the chamber. A plurality of eliminator plates or baffles 16 are provided near the discharge end of the chamber 9, these plates being of any suitable form and preferably comprising nested plates having angularly disposed surfaces. A set of similar plates 17 is disposed across the inlet end of the cooler chamber 9, the shape of the plates being similar to that of the plates 16. The plates 17 are preferably coated with a viscous fluid such as oil which may be supplied to the plates through a valve controlled pipe 18 and nozzle 19. The oil falling from the plates 17 is collected in the oil well 20 and carried off in the oil overflow pipe 21. The suction fan 8 is connected to the discharge end of the cooler chamber 9 and delivers conditioned air to the room 7 through the duct 22.

The heater H may take any suitable form and preferably comprises a coil of pipe or finned radiator 23 disposed at the discharge end of the cooler chamber 9 beyond the eliminator plates 16. Steam or any other suitable heating fluid may be introduced to the radiator 23 through the pipe 24 under the control of the valve 25 as hereinafter described, and an exhaust pipe 27 may be employed to withdraw steam and moisture from the radiator.

Referring now more particularly to the cooling surfaces or units employed in the cooler W, in the disclosed embodiment, these units take the form of a plurality of coil sections 10, 11, 14, 15 and 70, each of these sections being disposed across the cross section of the chamber 9, as clearly shown in Fig. 2. The coils of the sections may be provided with heat absorbing projections or may be constructed in cellular form, if desired. The coil sections 10, 11, 14, 15 and 70 are respectively supplied with refrigerated liquid from supply pipe 71 through the automatically operable valves 72, 73, 74, 75 and 76. Liquid is discharged from the coil sections 10, 11, 14, 15 and 70 through the pipe 31 which leads to the intake of a power driven pump 29.

Since the system is designed primarily to cool and dehumidify the air supplied to the enclosure, means are provided for at times supplying refrigerated water or other liquid to the coil sections of the cooler W. The cooling liquid is supplied to the coil sections by the pump 29 which withdraws liquid from the pipe 31 and returns this liquid either through a liquid cooler C or directly through the pipe 30 to the supply pipe 71. The proportion of withdrawn liquid which is passed through the cooler C is controlled by means of a mixing valve 39 and the supply of liquid to the various coil sections of the cooler is governed by the means of valves 72 through 76 as hereinafter explained. It should be understood that the liquid passing through the cooler C is refrigerated by contact with the evaporator coils of a mechanical refrigeration system or in any other suitable manner. It is generally preferred to operate the pump 29 at a constant speed and to regulate the flow of liquid to the coil sections by the valves 72 through 76. In order to prevent excess liquid pressure in the pipes of the system, the pump employed may be provided with a by-pass adapted to open when the liquid pressure reaches a predetermined high value or a pump of the impeller type may be used to provide a similar pressure limiting operation.

The various control devices and connections employed in the illustrated embodiment of the invention will now be described. The treatment of the air supplied to the enclosure is preferably governed automatically in accordance with atmospheric conditions within the enclosure, and accordingly, the sensitive elements of a dry bulb thermostat 33 and a wet bulb thermostat or hygrostat 34 are disposed within the duct 35 through which air is withdrawn from the enclosure 7. It is obvious that these sensitive elements might be disposed within the enclosure 7, if desired.

The dry bulb thermostat 33 is of known construction and is suitably designed to control the flow of compressed air from a source indicated by the pipe 36 to the operating diaphragms of the valves 25 and 39 in accordince with temperature variations of the air in the duct 35. The thermostat 33 is preferably designed to supply compressed air at full pressure when the temperature of the air in the duct 35 is above a predetermined value, to cut off the supply of such compressed air and vent the valve diaphragm chambers to atmosphere when the air temperature is below a predetermined value, and to supply a graduated change from atmospheric to full pressure as the air temperature varies between such predetermined values.

The wet bulb thermostate or hygrostat 34 is also of known construction and is designed to control the flow of compressed air from the pipe 36 to the operating diaphragms of the control valves 72 through 76 in accordance with changes in the temperature of evaporation or relative humidity of the return air in the duct 35. The wet bulb thermostat is preferably designed to supply compressed air at full pressure when the temperature of evaporation or relative humidity of the air in the duct 35 is below the predetermined value for which the instrument is set, to cut off the supply of compressed air and to vent these valve diaphragms when the temperature of evaporation or humidity of the air is above this predetermined value and to vary the air pressure on the valve diaphragms from atmospheric pressure to full pressure as the temperature of evaporation or relative humidity of the air in the duct 35 changes from a value slightly above to a value slightly below the predetermined value for which the instrument is set.

A pressure relief valve R is connected to the supply pipe 77 leading from the thermostat 33 to the valves 25 and 39. The relief valve R may take any suitable form and is designed in any desired manner to vent the control air pipe 77 to the atmosphere if the pressure in this pipe rises to an abnormally high value, such as 14 lbs. per square inch, the valve being suitably designed to remain open when once opened by such pressure until the air pressure in the pipe 77 has been reduced to say 7 lbs. per square inch.

One form of valve capable of operating in this manner has been shown in Fig. 5. The valve shown comprises a casing 78 and a small cylinder 79 carrying a sliding piston 80 and a large cylinder 81 carrying a larger piston 82, the piston 80 and 82 being rigidly connected by the rod 83. A valve operating rod 84 having a valve gate 85 on the upper end thereof is fixed to the upper surface of the small piston 80, and the gate 85 cooperates with a valve seat connected to the pipe 77. A vent port 86 permits the escape of air from the pipe 77 to the atmosphere when the gate 85 is lowered from its seat. The venting chamber 87 is sealed by a flexible diaphragm 89, and a duct 90 delivers air at the pressure in the pipe 77 to the small cylinder 79. A spring 91 normally holds the pistons 80 and 82 in their raised positions and thus maintains the valve gate 85 closed on its seat. In operation, when the air pressure in the pipe 77 reaches an abnormally high value such as 14 lbs. per square inch, this pressure, acting on the small piston 80, is sufficient to overcome the resistance of the spring 91 and the pistons 80 and 82 are depressed, thereby opening valve gate 85 and venting the pipe 77 to atmosphere through the port 86. As soon as the piston 80 is depressed, the air from the upper cylinder 79 is admitted to the lower cylinder 81 through the grooves 92 which are uncovered by the piston 80 in its descent. Since the piston 82 is of considerable greater area than is the piston 80, the valve gate 85 will be maintained open until the air pressure in the pipe 77 has been reduced to a considerably lower value than that required to initially depress the small piston 80, and accordingly, the valve remains open until the air pressure in the pipe 77 and the cylinders 79 and 81 falls to say 7 lbs. per square inch. At this point, the spring 91 raises the pistons and closes the valve.

The operation of the valves 25 and 39 will be best understood by reference to Figs. 3 and 4 wherein these valves have been shown in detail. Fig. 4 is an enlarged sectional view of the mixing valve 39 which controls the percentage of cooling liquid passing through the cooler C. The inlet 30 of this valve is connected to the discharge of the pump 29 and the valve gate 42 governs the division of liquid between the pipe 43 leading to the cooler C and the pipe 41 leading to the supply pipe 71. When the gate 42 is in the extreme upper position as shown, all of the liquid passes through the pipe 43 and the cooler C, and accordingly, the lowest available liquid temperature is obtained. With the gate 42 in the lowest position, all of the liquid is by-passed around the cooler C through the pipe 41 and the temperature of the liquid rises to a maximum value due to the heating of the liquid by the air in the chamber 9. At intermediate positions of the valve gate 42, intermediate liquid temperatures are obtained, the valve gate 42 is operated by a flexible diaphragm 45 which is biased upwardly by the spring 46. Thus, an increase in air pressure supplied to the diaphragm 45 corresponding to an increase in temperature of the air in the duct 35 acts to lower the valve gate 42 and by-pass a greater amount of liquid around the cooler C whereby the liquid temperature is increased whereas a decrease in control air pressure corresponding to a decrease in temperature of the return air permits the gate 42 to rise and supply a greater amount of liquid to the cooler C, whereby the liquid temperature is lowered. In the specific embodiment of the invention herein described, the spring 46 of the valve 39 is of such a strength that the gate 42 is closed on its lower seat at air pressures of 13 lbs. per square inch or higher, and is closed on its upper seat at pressures of 7 lbs. per square inch or lower.

The steam valve 25 is operated by a direct acting diaphragm and the construction of a valve of this type is shown in Fig. 3. The valve gate 47 is operated by a flexible diaphragm 48 acting against the pressure of a spring 49, the spring acting to raise the gate and open the valve when the control air pressure on the diaphragm decreases below a predetermined value and the air pressure above a predetermined value acting to lower the gate and close the valve against resistance of the spring. This type of valve is also employed to control the flow of cooling liquid to the coil sections 10, 11, 14, 15 and 70 and accordingly, the illustration in Fig. 3 is representative not only of the steam valve 25 but also of the liquid valves 72 through 76. In the specific embodiment of the invention herein described, the steam valve 25 is assumed to be closed at pressures of 6 lbs. per square inch or higher and open at atmospheric pressure. The valve 72 is assumed to close at 14 lbs. pressure or higher and open at 12 lbs. pressure or lower, the valve 73 is assumed to close at 12 lbs. pressure or higher and open at 10 lbs. pressure or lower, the valve 74 is assumed to close at 10 lbs. pressure or higher and open at 8 lbs. pressure or lower, the valve 75 is assumed to close at 8 lbs. pressure or higher and open at 6 lbs. pressure or lower, and the valve 76 is assumed to close at 6 lbs. pressure or higher and open at 4 lbs. pressure or lower.

The liquid employed in the system is preferably water, but it is sometimes preferred to employ a cooling liquid having a lower freezing temperature or a higher vaporizing temperature than water or one having both of these characteristics. Thus, liquids such as brine solutions or ethylene glycol either in solution with water or in the anhydrous state may be used.

In operating the illustrated embodiment of our improved air conditioning system, fresh air from outside of the enclosure is drawn in through the duct 60 and is mixed with return air from the enclosure delivered through the duct 35. All of the mixed fresh and used air then enters the chamber 9 through the oil coated plates 17, and foreign bodies such as dust, lint, etc., are removed from the air at this point. The passage of the air through the plates 17 also serves to remove eddys from the air currents so that the air flows smoothly and uniformly through the chamber 9. The fresh and recirculated air passes through the chamber 9, preferably at a constant velocity, between the various portions of the coil sections 10, 11, 14, 15 and 70 and this air is cooled and dehumidified by contact with these coil sections in accordance with the condition of the control apparatus as hereinafter explained. Since only a portion of the air passing through the chamber 9 comes into intimate heat exchanging contact with active cooling surfaces, some of the air is cooled to and below its dewpoint whereas other portions of the air in the stream are cooled to a lesser degree. Thus, for example, when the coil sections are at a temperature below the dewpoint of the entering air, a portion of this air is cooled below its dewpoint and dehumidified by contact with the active coil sections, while other portions of this air pass between the coils and accordingly retain considerable heat. The cooled and dehumidified air mixes with and is heated by the warmer air and accordingly, the air discharged from the chamber 9, although dehumidified to a certain extent, is nevertheless at a comfortable temperature well above saturation.

In leaving the chamber 9 all of the air passes through the eliminator plates 16, which act to remove all free moisture from the air.

The conditioned air is delivered to the enclosure 7 through the duct 22 and the used air is returned from the enclosure through the duct 35.

In order that the air in the enclosure 7 may be continuously replaced with fresh air, a certain proportion of the return air is expelled from the room through the duct 65, this amount of wasted air being made up from the fresh air entering the system through the duct 60. It will be apparent that rather than discharge the air through a special duct, this air may be permitted to escape through the doors, windows or other openings in the enclosure.

The operation of the automatic control means disclosed will be best understood from an explanation of the operation of the system under changing outside and indoor atmospheric conditions.

Assume first that due to the high temperature and high relative humidity of the outside air or to the supply of considerable heat and moisture to the air in the enclosure from sources therein, or to a combination of these factors, it is necessary to dehumidify and cool the air supplied to the enclosure to a large extent. Under these conditions, the dry bulb thermostat 33 supplied a moderate air pressure of say 7 lbs. per square inch to the operating diaphragms of the steam valve 25 and the mixing valve 39, maintaining the steam valve 25 closed. As explained above, the spring 46 of the mixing valve 39 is strong enough to maintain the gate 42 of this valve closed on its upper seat against this air pressure whereby all of the cooling liquid is passed through the cooler C and the lowest obtainable liquid temperature is produced. The wet bulb thermostat or hygrostat 34 supplies a comparatively low pressure of say 5 lbs. per square inch to the operating diaphragms of the valves 72 through 76 whereby the valves 72, 73, 74 and 75 are open and the valve 76 is closed. Accordingly, some of the air in the stream passing through the chamber 9 comes into intimate contact with the cool surfaces of the active coil sections 10, 11, 14 and 15 and some of this air is cooled below its dewpoint and dehumidified, while other portions of the air in the stream are cooled to a lesser extent and retain sufficient heat to maintain the air stream to a temperature above saturation.

Assume now that there is a decrease in the relative humidity of the air in the enclosure due to a decrease in outside humidity or in the supply of moisture from sources within the enclosure or from a combination of these factors. The wet bulb thermostat 34 responds to this change and increases the control air pressure on the diaphragms of the valves 72 through 75, thereby closing some of these valves and reducing the number of cooling coil sections which are active. The decrease in the number of the active cooling coil sections reduces the dehumidifying effect and also reduces the amount of heat removed from the air stream. As a consequence, the air temperature increases and the dry bulb thermostat 33 responds and increases the air pressure on the operating diaphragm of the valve 39, thereby permitting some of the cooling liquid to by-pass around the cooler C, and accordingly, raise the cooling liquid temperature. If this increase in cooling liquid temperature reduces the dehumidifying effect too greatly, the wet bulb thermostat 34 again responds and opens more of valves 72 through 76 to supply cooling liquid to more of the coil sections and increase the dehumidifying action.

Assume now that there is a decrease in the amount of heat supplied to the system due to a lowering of the outside temperature or to a decrease in the amount of heat emanating from sources within the enclosure. The dry bulb thermostat 33 immediately responds to the lower temperature and reduces the pressure on the operating diaphragms of the valves 25 and 39. This reduction in the control air pressure permits the spring 46 of the mixing valve 39 to close the gate 42 of this valve on its upper seat. The steam valve 25 is preferably set to remain closed until after the control air pressure has been reduced below the value at which the gate 42 of the valve 39 engages its upper seat. Thus, the reduction in control air pressure from the dry bulb thermostat 33 permits the gate 47 of the steam valve 25 to rise to an intermediate point, admitting steam to the heater radiator 23, and the desired air temperature is maintained. If the relative humidity of the air withdrawn from the enclosure becomes too low because of the higher air temperature, the wet bulb thermostat 34 further increases the control air pressure on the diaphragms of the valves 72 through 76 and thereby reduces the number of active cooling coil sections to limit to the desired degree the dehumidifying action.

As the supply of heat to the system is further reduced, the dry bulb thermostat 33 responds and reduces the control air pressure to a point at which the steam valve 25 is opened more widely and more heat is accordingly supplied to the treated air to maintain the desired temperature within the enclosure.

It will be understood that the wet bulb thermostat or hygrostat 34 automatically regulates the number of active cooling coil sections and so automatically maintains the desired degree of dehumidification in the cooler in accordance with conditions of humidity in the enclosure.

Due to the fact that the heat exchanging relation between the cooling liquid and the air stream, as well as the temperature of the cooling liquid, is variably controlled, the range of the system as well as the rapidity of its response to changing conditions is materially increased.

If, because of a sudden increase in outside air temperature or in the amount of heat supplied from sources in the enclosure, the control air pressure delivered by the dry bulb thermostat 33 increases to an abnormal high value of say 14 lbs., the gate 42 of the mixing valve 39 will be closed on its lower seat and all of the cooling liquid will be recirculated. Under these conditions, it is desirable to return the dry bulb thermostat control air pressure to a reasonable value so that the desired cooling effect can be maintained and the air temperature reduced. This is accomplished by the emergency relief valve R which, as explained above, vents the control air pipe 77 to the atmosphere when the pressure in this pipe reaches an abnormally high value of 14 lbs. per square inch, the relief valve remaining open until the pressure in this pipe has been reduced to approximately 7 lbs. per square inch. This reduction in control air pressure permits the gate 42 of the mixing valve 39 to rise and engage its upper seat, thereby passing all of the cooling liquid through the cooler C, cooling the active coil sections and reducing the temperature of the air stream. This reduction in air stream temperature causes the dry bulb thermostat 33 to respond and reduce the control air pressure supplied thereby, whereby normal operating conditions are again maintained.

The term "atmospheric conditions" as employed in the specification and claims herein, means conditions of temperature or relative humidity or a combination of these conditions.

Although the invention has been disclosed in connection with a single air conditioning system embodying the principles thereof, it should be understood that various changes or omissions may be made in the system disclosed without departing from the scope of the invention as defined in the appended claims. Thus, in certain cases where a smaller capacity or range of control variation is required, the temperature control of the cooling liquid may be dispensed with and the operation of the system may be governed by altering only the number of active cooling coil surfaces in accordance with atmospheric conditions in the enclosure. Further, rather than employing a cooled liquid to maintain the desired temperature in the cooling coil sections, the refrigerant from a suitable refrigerating system may be passed directly through these coils under the control of atmospheric conditions in the enclosure.

We claim:

1. In an air conditioning system, in combination with an enclosure in which conditioned air is required, a cooler chamber, means for passing all of the air to be supplied to the enclosure in a single stream through said chamber, a plurality of separate cooling coils each extending entirely across the cross section of said cooler chamber, separately controllable means for supplying a refrigerating medium to each of said coils, means governed in accordance with changes in atmospheric conditions in said enclosure for variably controlling the temperature of said refrigerating medium and the number of coils to which the medium is supplied and means for supplying all of the air passing through said cooler chamber to said enclosure.

2. In an air conditioning system, in combination with an enclosure in which conditioned air is required, a cooler chamber, means for passing all of the air to be supplied to the enclosure in a single stream through said chamber, a plurality of separate cooling coils each extending entirely across the cross section of said cooler chamber, means governed in accordance with changes in atmospheric conditions in the enclosure for selectively supplying a refrigerating medium to different numbers of said cooling coils, means governed by atmospheric conditions in said enclosure for variably controlling the temperature of said refrigerating medium and means for supplying all of the air passing through said cooler chamber to said enclosure.

3. In an air conditioning system, in combination with an enclosure in which conditioned air is required, a cooler chamber, means for passing all of the air to be supplied to the enclosure in a single stream through said chamber, a plurality of separate cooling coils each extending entirely across the cross section of said cooler chamber, separately controllable means for supplying a refrigerating medium to each of said coils, means governed in accordance with changes in the temperature of the air in said enclosure for variably controlling the temperature of said refrigerating medium and means governed in accordance with changes in atmospheric conditions in said enclosure for variably controlling the number of coils to which the refrigerating medium is supplied.

4. In an air conditioning system, in combination with an enclosure in which conditioned air is required, a cooler chamber, means for passing all of the air to be supplied to the enclosure in a single stream through said chamber, a plurality of separate cooling coils extending across the cross section of said cooler chamber, means governed in accordance with changes in the humidity of the air in said enclosure for selectively supplying a refrigerating medium to different numbers of said cooling coils out of contact with the air in said stream, means governed in accordance with changes in the temperature of the air in said enclosure for variably controlling the temperature of said refrigerating medium and means for supplying all of the air passing through said chamber to said enclosure.

5. In an air conditioning system in combination with an enclosure in which conditioned air is required, a cooler chamber, means for passing all of the air to be supplied to the enclosure in a single stream through said chamber, a plurality of separate cooling coils each extending entirely across the cross section of said cooler chamber, means governed in accordance with changes in the humidity of the air in said enclosure for selectively supplying a refrigerating medium to different numbers of said cooling coils, means governed in accordance with changes in the temperature of the air in said enclosure for variably controlling the temperature of said refrigerating medium, means for insuring the refrigeration of said medium to a low temperature when the temperature responsive means becomes unbalanced and means for supplying all of the air passing through said cooler chamber to said enclosure.

6. In an air conditioning system, in combination with an enclosure in which conditioned air is used, a cooler chamber, means for passing air to be supplied to the enclosure in a single stream through said chamber, a plurality of cooled surfaces extending across the cross section of said cooler chamber in the path of said air stream, means for selectively cooling said surfaces to a temperature below the dew-point of the air entering said chamber whereby a quantity of moisture is condensed from the air, and means for selectively reducing the total cooled surface area exposed to said air stream while maintaining a sufficient temperature difference between the cooled surfaces and the entering air stream to condense a substantially unchanged quantity of moisture from the air in said stream, whereby the amount of sensible heat abstracted from the air stream may be reduced while the amount of heat abstracted from the air stream as latent heat of condensation is maintained substantially unchanged.

7. In an air conditioning system, in combination with an enclosure in which conditioned air is used, a cooler chamber, means for passing air to be supplied to the enclosure in a single stream through said chamber, a plurality of cooled surfaces each extending entirely across the cross section of said cooler chamber in the path of said air stream, means for selectively cooling said surfaces to a temperature below the dewpoint of the air entering said chamber whereby a quantity of moisture is condensed from the air, and means governed in accordance with changes in atmospheric conditions in said enclosure for selectively reducing the total cooled surface area exposed to said air stream while maintaining a sufficient temperature difference between the cooled surfaces and the entering air stream to condense a substantially unchanged quantity of moisture from the air in said stream, whereby the amount of sensible heat abstracted from the air stream may be reduced while the amount of heat abstracted from the air stream as latent heat of condensation is maintained substantially unchanged.

8. In an air conditioning system, in combination with an enclosure in which conditioned air is used, a cooler chamber, means for passing air to be supplied to the enclosure in a single stream through said chamber, a plurality of cooled surfaces each extending entirely across the cross section of said cooler chamber in the path of said air stream, means for selectively cooling said surfaces to a temperature below the dewpoint of the air entering said chamber whereby a quantity of moisture is condensed from the air, and means governed in accordance with changes in the humidity of the air in said enclosure for selectively reducing the total cooled surface area exposed to said air stream while maintaining a sufficient temperature difference between the cooled surfaces and the entering air stream to condense a substantially unchanged quantity of moisture from the air in said stream, whereby the amount of sensible heat abstracted from the air stream may be reduced while the amount of heat abstracted from the air stream as latent heat of condensation is maintained substantially unchanged.

9. In an air conditioning system, in combination with an enclosure in which conditioned air is required, a cooler chamber, means for passing air to be supplied to the enclosure in a stream through said chamber, a plurality of separate cooling coils each extending entirely across the cross section of said cooler chamber, controllable means for supplying a refrigerating medium to each of said coils, means for controlling the temperature of said refrigerating medium and the number of coils to which the medium is supplied and means for supplying the air passing through said cooler chamber to said enclosure.

10. In an air conditioning system, in combination with an enclosure in which conditioned air is required, a cooler chamber, means for passing through said chamber air to be supplied to the enclosure, a plurality of separate cooling coils each extending entirely across the cross section of said cooler chamber, separately controllable means for supplying refrigerating medium to each of said coils, means governed in accordance with changes in atmospheric conditions in said enclosure for variably controlling the temperature of said refrigerating medium and the number of coils to which the medium is supplied, and means for supplying air passing through said cooler chamber to said enclosure.

11. In an air conditioning system, in combination with an enclosure in which conditioned air is required, a cooler chamber, means for passing through said chamber air to be supplied to the enclosure, a plurality of separate cooling coils each extending entirely across the cross section of said cooler chamber, means governed in accordance with changes in atmospheric conditions in the enclosure for selectively supplying a refrigerating medium to different numbers of said coils, means governed by atmospheric conditions in said enclosure for variably controlling the temperature of said refrigerating medium, and means for supplying air passing through said cooler chamber to said enclosure.

12. In an air conditioning system, in combination with an enclosure in which conditioned air is required, a cooler chamber, means for passing through said chamber air to be supplied to the enclosure, a plurality of separate cooling coils each extending entirely across the cross section of said cooler chamber, separately controllable means for supplying a refrigerating medium to each of said coils, means governed in accordance with changes in the temperature of the air in said enclosure for variably controlling the temperature of said refrigerating medium and means governed in accordance with changes in atmospheric conditions in said enclosure for variably controlling the number of coils to which the refrigerating medium is supplied.

13. In an air conditioning system, in combination with an enclosure in which conditioned air is required, a cooler chamber, means for passing through said chamber air to be supplied to the enclosure, a plurality of separate cooling coils extending across the cross section of said cooler chamber, means governed in accordance with changes in the humidity of the air in said enclosure for selectively supplying a refrigerating medium to different numbers of said cooling coils, means governed in accordance with changes in the temperature of the air in said enclosure for variably controlling the temperature of said refrigerating medium, and means for supplying air passing through said chamber to said enclosure.

14. In an air conditioning system, in combination with an enclosure in which conditioned air is required, a cooler chamber, means for passing through said chamber air to be supplied to the enclosure, a plurality of separate cooling coils each extending entirely across the cross section of said cooler chamber, and means governed in accordance with changes in the humidity of the air in said enclosure for selectively supplying a refrigerating medium to different numbers of said coils, means governed in accordance with changes in the temperature of the air in said enclosure for variably controlling the temperature of said refrigerating medium, means for insuring the refrigeration of said medium to a low temperature when the temperature-responsive means becomes unbalanced, and means for supplying air passing through said cooler chamber to said enclosure.

15. In an air conditioning system, in combination with an enclosure in which conditioned air is used, a cooler chamber, means for passing through said chamber air to be supplied to the enclosure, a plurality of cooled surfaces extending across the cross section of said cooler chamber in the path of said air, means for selectively cooling said surfaces to a temperature below the dewpoint of the air entering said chamber whereby a quantity of moisture is condensed from the air, and means for selectively reducing the total cooled surface area exposed to said air while maintaining a sufficient temperature difference between the cooled surfaces and the entering air to condense a substantially unchanged quantity of moisture from said air, whereby the amount of sensible heat abstracted from the air stream may be reduced while the amount of heat abstracted from the air as latent heat of condensation is maintained substantially unchanged.

16. In an air conditioning system, in combination with an enclosure in which conditioned air is used, a cooler chamber, means for passing through said chamber air to be supplied to the enclosure, a plurality of cooled surfaces each extending entirely across the cross section of said cooler chamber in the path of said air, means for selectively cooling said surfaces to a temperature below the dewpoint of the air entering said chamber, whereby a quantity of moisture is condensed from the air, and means governed in accordance with changes in atmospheric conditions in said enclosure for selectively reducing the total cooled surface area exposed to said air while maintaining a sufficient temperature difference between the cooled surfaces and the entering air to condense a substantially unchanged quantity of moisture from the air, whereby the amount of sensible heat abstracted from the air may be reduced while the amount of heat abstracted from the air as latent heat of condensation is substantially unchanged.

17. In an air conditioning system, in combination with an enclosure in which conditioned air is used, a cooler chamber, means for passing through said chamber air to be supplied to the enclosure, a plurality of cooled surfaces each extending entirely across the cross section of said cooler chamber in the path of said air, means for selectively cooling said surfaces to a temperature below the dewpoint of the air entering said chamber, whereby a quantity of moisture is condensed from the air, and means for selectively reducing the total cooled surface area exposed to said air while maintaining a sufficient temperature difference between the cooled surfaces and the entering air to condense a substantially predetermined quantity of moisture from the air, whereby the amount of sensible heat abstracted from the air may be reduced while the amount of heat abstracted from the air as latent heat of condensation is controlled to a predetermined degree.

ALFRED D. KARR.
KARL D. PERKINS.